United States Patent [19]
Scott

[11] Patent Number: 5,853,447
[45] Date of Patent: Dec. 29, 1998

[54] METHOD AND APPARATUS FOR DELIVERING A CASED GLASS STREAM

[75] Inventor: Garrett Lee Scott, Toledo, Ohio

[73] Assignee: Owens-Brockway Glass Container Inc., Toledo, Ohio

[21] Appl. No.: 833,201

[22] Filed: Apr. 14, 1997

[51] Int. Cl.$^6$ ............................... C03B 5/26; C03B 7/08; C03B 7/088

[52] U.S. Cl. ............................... 65/121; 65/126; 65/129; 65/145; 65/325; 65/328

[58] Field of Search ............................ 65/145, 146, 121, 65/122, 123, 126, 127, 129, 324, 325, 328, 330, 331

[56] References Cited

U.S. PATENT DOCUMENTS

| | | |
|---|---|---|
| 1,519,885 | 12/1924 | Tucker et al. . |
| 1,556,381 | 10/1925 | Troutman et al. . |
| 1,622,666 | 3/1927 | Peiler . |
| 1,828,217 | 10/1931 | Barker, Jr. . |
| 3,015,842 | 1/1962 | Stalego . |
| 3,078,695 | 2/1963 | Kozak et al. . |
| 3,288,583 | 11/1966 | Sheldon . |
| 3,291,584 | 12/1966 | Sheldon . |
| 3,508,904 | 4/1970 | Keefer . |
| 3,554,726 | 1/1971 | Daly . |
| 3,580,713 | 5/1971 | Schirm et al. . |
| 3,582,299 | 6/1971 | Gladwell, Jr. . |
| 3,607,184 | 9/1971 | Williams . |
| 3,622,289 | 11/1971 | Hansen et al. . |
| 3,625,671 | 12/1971 | Schirm et al. . |
| 3,899,315 | 8/1975 | Siegmund . |
| 3,960,530 | 6/1976 | Iyengar . |
| 4,023,953 | 5/1977 | Megles, Jr. et al. . |
| 4,133,664 | 1/1979 | Aulich et al. . |
| 4,217,123 | 8/1980 | Titchmarsh . |
| 4,247,320 | 1/1981 | Bansal et al. . |
| 4,299,609 | 11/1981 | Aulich et al. . |
| 4,305,747 | 12/1981 | Kirkman et al. . |
| 4,340,160 | 7/1982 | Van Geel et al. . |
| 4,381,932 | 5/1983 | Olson et al. . |
| 4,457,771 | 7/1984 | Ambrogi . |
| 4,466,818 | 8/1984 | Brongersma . |
| 4,722,748 | 2/1988 | Duga . |
| 4,723,981 | 2/1988 | Duga . |
| 4,723,982 | 2/1988 | Duga . |
| 4,740,401 | 4/1988 | Barkhau et al. . |
| 4,875,917 | 10/1989 | Lentz . |
| 4,897,100 | 1/1990 | Nice . |
| 5,204,120 | 4/1993 | Hirschberger . |
| 5,593,472 | 1/1997 | Paul . |

*Primary Examiner*—Steven P. Griffin

[57] ABSTRACT

Apparatus for forming a cased glass stream that includes at least one pair of aligned orifices coupled to sources of core and casing glass such that glass flows by gravity from the first and second sources through the aligned orifices to form a cased glass stream. The orifices are carried by an orifice housing mounted on a frame for movement into abutment seating engagement of the orifice housing against the core and casing glass delivery mechanisms. The frame in accordance with the present invention includes a gimbal mounting arrangement mounting the orifice housing to the frame so as to be pivotable about a pair of pivot axes that are orthogonal to each other and to the axis of alignment of the orifices. This gimbal mounting arrangement helps accommodate misalignment between the seating surfaces on the orifice housing and the glass delivery mechanisms, and to reduce glass leakage during operation.

7 Claims, 2 Drawing Sheets

METHOD AND APPARATUS FOR DELIVERING A CASED GLASS STREAM

The present invention is directed to delivery of a glass stream for forming glass charges or gobs for glassware manufacture, and more particularly to a method and apparatus for delivering a so-called cased glass stream in which an inner or core glass is surrounded by an outer or casing glass layer.

BACKGROUND AND SUMMARY OF THE INVENTION

It has heretofore been proposed to provide a cased glass stream for forming glassware having layered wall segments. U.S. application Ser. Nos. 08/374,371 and 08/374,372 disclose techniques for delivering such a cased glass stream in which core glass from a first source is delivered through a first orifice. A second orifice is vertically spaced beneath and aligned with the first orifice, and is surrounded by an annular chamber that communicates with the second orifice through the gap between the first and second orifices. A heated tube delivers casing glass from a second glass source to the annular chamber that surrounds the second orifice. Glass flows by force of gravity from the first and second sources through the first and second orifices in such a way that a cased glass stream emerges from the second orifice. This cased glass stream may be sheared by conventional techniques to form individual cased glass gobs for delivery to conventional individual section glassware forming machines. U.S. application Ser. No. 08/671,894 discloses an improved apparatus and method in which the orifices are disposed within an orifice ring housing that is carried by a frame for bringing the orifice ring housing into seating engagement against the core and casing glass delivery mechanisms. The frame is mounted on springs that compress as the orifice ring housing seats against the core and casing glass delivery mechanisms, and has jack screws for firmly locking the frame and orifice ring housing in position against the glass delivery means.

Although the techniques disclosed in the noted patent applications address and overcome problems theretofore extant in the art, further improvements remain desirable. For example, it is difficult to align the orifice ring housing inlet openings to the core and casing glass delivery mechanisms so that the mating surfaces close completely to prevent glass leakage. It has been proposed to place soft refractory clay and water mud mixtures on the sealing face of the orifice ring housing prior to engagement of the orifice ring housing against the glass delivery mechanisms. However, high-temperature preheating of the orifice ring housing prior to installation can cause the mud mixture to harden prematurely. It is therefore a general object of the present invention to provide a method and apparatus for improved seating engagement between the orifice ring housing and the glass delivery mechanisms in an otherwise conventional cased glass delivery system for obtaining improved seating and sealing engagement between the orifice ring housing and the glass delivery mechanisms, and reducing glass leakage between the delivery mechanisms and the orifice ring housing.

Apparatus for forming a cased glass stream in accordance with a presently preferred embodiment of the invention includes at least one pair of aligned orifices coupled to sources of core and casing glass such that glass flows by gravity from the first and second sources through the aligned orifices to form a cased glass stream. The orifices are carried by an orifice housing mounted on a frame for movement into seating engagement of the orifice housing against the core and casing glass delivery mechanisms. The frame in accordance with the present invention includes a gimbal mounting arrangement mounting the orifice housing to the frame so as to be pivotable about a pair of pivot axes that are orthogonal to each other and to the axis of alignment of the orifices. This gimbal mounting arrangement helps accommodate misalignment between the seating surfaces on the orifice housing and the glass delivery mechanisms, and thereby to reduce glass leakage during operation.

In a presently preferred embodiment of the invention, the orifice ring housing has a first seating surface for abutment seating engagement with the source of core glass, and a second seating surface spaced from the first seating surface for abutment seating engagement with the source of casing glass. One of the gimbal mounting axes extends between and intersects the first and second seating surfaces, while the other gimbal mounting axis is disposed between the first and second seating surfaces. In the preferred embodiment of the invention, these seating surfaces are disposed in spaced parallel planes, and both gimbal axes are disposed in the lower of these planes, specifically the plane of engagement between the orifice ring housing and the core glass source.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE EMBODIMENTS

Figure 1:
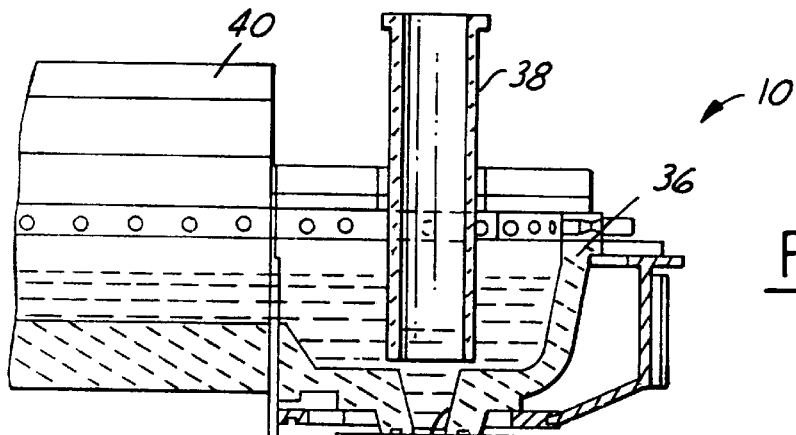
FIG. 1 is a fragmentary elevational schematic diagram of a glass delivery system in accordance with a presently preferred embodiment of the invention.

FIG. 1 illustrates a system 10 for delivering a stream of cased glass. A first forehearth 12 delivers core glass to a spout 14 that has at least one opening 16 at the lower end thereof. Spout 14 is surrounded by a protective case 18, preferably constructed of nonmagnetic metal such as stainless steel. A tube 20 controls delivery of core glass from spout 14 through opening 16 to and through at least one first orifice 22 carried by an upper orifice ring 24 beneath spout 14. A lower orifice ring 26 carries at least one second orifice 28 positioned beneath orifice(s) 22 and axially aligned therewith. Orifice 28 is surrounded by an annular chamber 30 formed between orifice rings 24, 26. Chamber 30 communicates with orifice 28 by means of a lateral space or gap between orifices 22, 28. Annular chamber 30 is coupled by a delivery tube 32 to the opening 34 at the lower end of a casing glass spout 36. Spout 36 includes a delivery control tube 38, and is coupled to a casing glass forehearth 40. Delivery tube 32 is resistance-heated by control electronics 42 for maintaining flow of casing glass to chamber 30. To the extent thus far described, system 10 in FIG. 1 is essentially the same as disclosed in above-noted U.S. application Ser. Nos. 08/374,371 and 08/374,372.

As disclosed in above-noted U.S. application Ser. No. 08/671,894, and referring to FIG. 2, orifice rings 24, 26 are mounted within an orifice ring housing 44, so that both orifice rings are moveable as a unit into and out of engagement with the sources of core and casing glass. Orifice ring housing 44 is carried by a rectangular frame 46 supported by synchronized lift jacks 48 to raise the orifice ring housing into place. Spring assemblies 50 at the four corners of frame 46 are used to indicate when the orifice ring housing is seated against the lower ends of the core and casing glass delivery tubes. Lifting of the orifice rings by means of jacks 48 is terminated, and jack screws 52 are adjusted to prevent further movement of orifice ring housing frame 46 and orifice ring housing 44. The disclosures of above-noted U.S. application Ser. Nos. 08/374,371, 08/374,372 and 08/671,894 are incorporated herein by reference by purposes of background.

Figure 2:
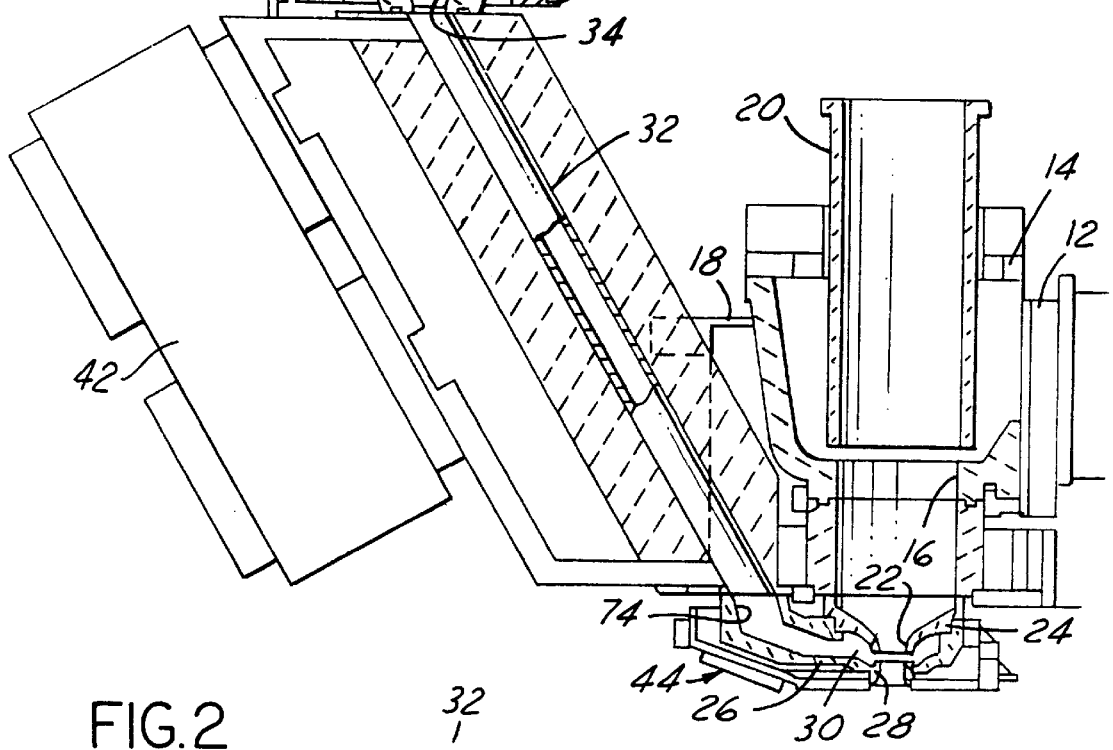
FIG. 2 is a fragmentary elevational view on an enlarged scale of a portion of the glass delivery system illustrated in FIG. 1.
Figure 3:
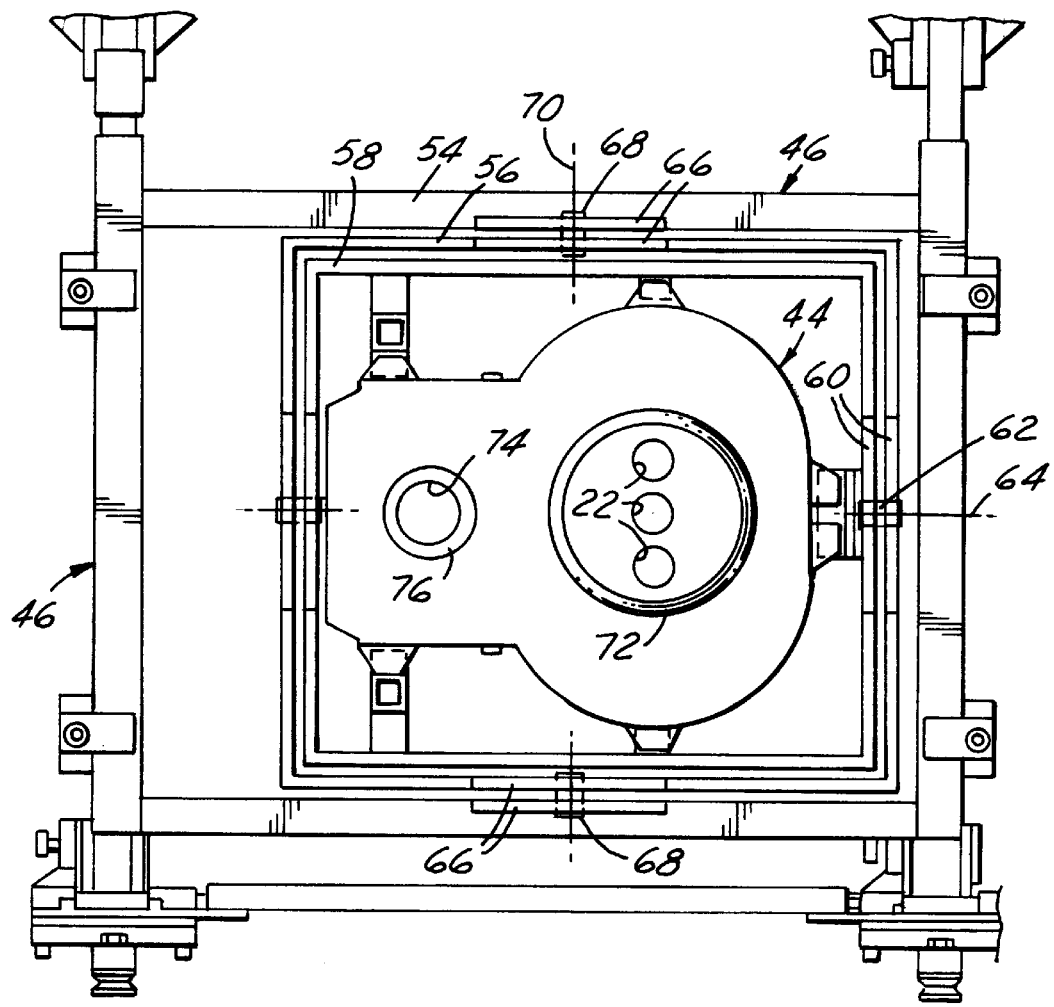
FIG. 3 is a sectional view taken substantially along the line 3—3 in FIG. 2, and providing a plan view of the orifice ring housing gimbal mounting arrangement in accordance with the presently preferred embodiment of the invention.
Figure 4:
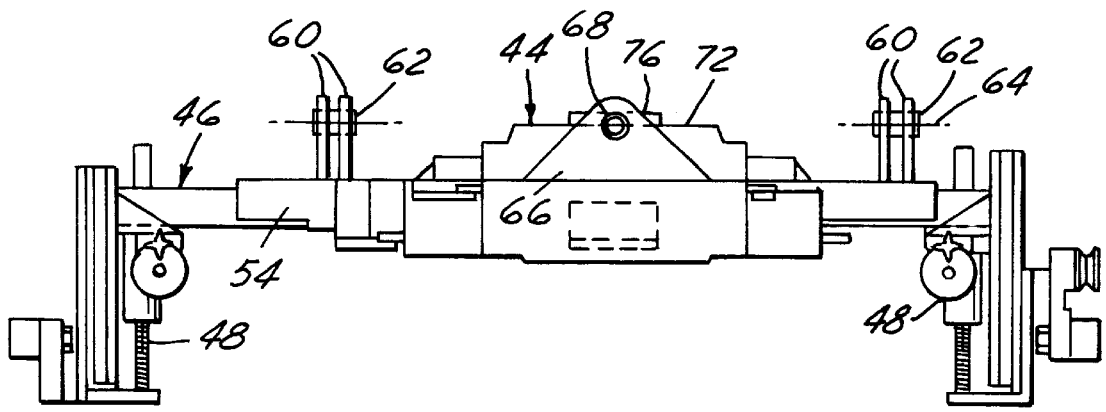
FIG. 4 is a side elevational view of the orifice ring housing gimbal mounting arrangement illustrated in FIG. 3.

In accordance with the present invention, frame 46 includes a gimbal mounting arrangement mounting orifice ring housing 44 to pivot about two axes that are orthogonal to each other and to the axis of alignment of orifices 22, 28. Specifically, as shown in FIGS. 2–4, frame 46 includes a rectangular outer frame 54 carried by lift jacks 48, a rectangular intermediate frame 56 (FIG. 3), and a rectangular inner frame 58 within which orifice ring housing 44 is rigidly mounted. Frames 54, 56, 58 are substantially coplanar. Frames 56, 58 have associated adjacent and laterally aligned risers 60 that are interconnected by axially aligned pivot pins 62 so as to define a first axis 64 of rotation of orifice ring housing 44 and inner frame 58 with respect to intermediate frame 56. Intermediate frame 56 and outer frame 54 each have a pair of aligned risers 66 interconnected by axially aligned pivot pins 68 so that intermediate frame 56 is pivotable about a second axis 70 with respect to outer frame 54. Pivot axes 64, 70 are orthogonal to each other and to the axis of alignment of orifices 22, 28.

In the presently preferred embodiment of the invention illustrated in the drawings, orifice ring housing 54 carries three first orifices 22 (as well as three second orifices 28) all surrounded by annular chamber 30 for producing three cased gob streams. Orifices 22 all lie within a planar annular seating surface 72 formed on the top surface of orifice ring housing 44. The inlet 74 to annular chamber 30 opens at a second planar annular seating surface 76 that is laterally spaced from seating surface 72. Ideally, planar seating surfaces 72, 76 would be coplanar. However, when constructing the presently preferred embodiment of the invention illustrated in the drawings, it was necessary to position surfaces 72, 76 in spaced parallel planes, with the plane of surface 76 being above the plane of surface 72, to accommodate mounting of casing glass delivery tube 32. Axes 64, 70 preferably are coplanar. The plane of axes 64, 70 should be at or slightly beneath the planes of seating surfaces 72, 76.

With orifice ring housing 44 mounted on frame 56 by means of a two-axis gimbal mounting arrangement as described, the orifice ring housing is free to pivot about the two gimbal axes as the orifice ring housing is moved by frame 46 and jack screws 48 into abutment seating engagement with the lower ends of the core and casing glass delivery tubes. Suitable locking means are provided (not shown for simplicity) to lock gimbal frames 56, 58 in position when best alignment has been achieved. This arrangement accommodates slight misalignment among the seating surfaces so as to obtain the best available seating surface fit. Leakage of glass through the seating surface joints is thereby reduced.

I claim:

1. Apparatus for forming a cased glass stream having an inner core glass surrounded by an outer casing glass, said apparatus including means for delivering core glass from a first source through a first orifice, means forming a second orifice vertically spaced beneath and aligned with said first orifice with a chamber surrounding said second orifice and communicating with said second orifice through a gap between said first and second orifices, and means for delivering casing glass from a second source to said chamber such that glass flows by gravity from said first and second sources through said orifices to form said cased glass stream, said first and second orifices being carried by an orifice housing mounted on a frame for movement into seating engagement of said orifice housing against said means for delivering core and casing glass, said frame including means mounting said orifice housing to said frame so as to be pivotable about at least one axis orthogonal to an axis of alignment of said orifices for accommodating misalignment between said orifice housing and said delivering means.

2. The apparatus set forth in claim 1 wherein said frame includes means mounting said orifice housing to said frame so as to be pivotable about two axes that are orthogonal to each other and to the axis of alignment of said orifices.

3. The apparatus set forth in claim 2 wherein said orifice housing has first seating means with a planar seating surface for seating engagement with said means for delivering core glass and second seating means spaced from said first seating means with a planar seating surface for seating engagement with said means for delivering casing glass, and where said two axes lie in a plane parallel to at least one of said planar seating surfaces.

4. The apparatus set forth in claim 3 wherein said seating surfaces are in spaced parallel planes, and wherein said two axes both lie in the plane of the seating surface for management with said means for delivering core glass.

5. The apparatus set forth in claim 2 wherein said frame comprises an outer frame, an intermediate frame disposed within said outer frame, an inner frame disposed within said intermediate frame, and gimbal mounting means mounting said intermediate frame to said outer frame to pivot about a first of said two axes and mounting said inner frame to said intermediate frame to pivot about a second of said two axes.

6. A method of forming a cased glass stream in which glass from first and second sources is delivered to first and second aligned orifices in such a way that glass from the second source forms a casing around an inner core of glass from the first source, said method including the steps of:

(a) mounting said first and second orifices in an orifice housing, (b) mounting said housing on gimbal mounting means for pivotal motion about at least one axis orthogonal to an axis of alignment of said orifices, and (c) moving said orifice housing into seating abutment with said first and second sources in such a way that said housing is free to pivot about said at least one axis to accommodate misalignment between said housing and said first and second sources.

7. The method set forth in claim 6 wherein said step (b) comprises the step of mounting said housing on gimbal mounting means for pivotal motion about two axes that are orthogonal to each other and to the axis of alignment of said orifices.

* * * * *